United States Patent [19]

Araujo et al.

[11] Patent Number: 4,549,894
[45] Date of Patent: Oct. 29, 1985

[54] ULTRAVIOLET ABSORBING PHOTOCHROMIC GLASS OF LOW SILVER CONTENT

[75] Inventors: Roger J. Araujo, Big Flats; George B. Hares, Corning; David J. Kerko, Corning; David W. Morgan, Corning; David L. Morse, Corning, all of N.Y.

[73] Assignee: Corning Glass Works, Corning, N.Y.

[21] Appl. No.: 617,908

[22] Filed: Jun. 6, 1984

[51] Int. Cl.[4] .................................................. C03C 3/26
[52] U.S. Cl. ....................................... 65/30.11; 501/13
[58] Field of Search .......................... 65/30.11; 501/13; 350/354; 351/162

[56] References Cited

U.S. PATENT DOCUMENTS

| | | | |
|---|---|---|---|
| 3,208,860 | 9/1965 | Armistead et al. | 350/354 X |
| 3,653,863 | 4/1972 | Araujo et al. | 65/30.11 |
| 3,784,386 | 1/1974 | Araujo et al. | 501/13 |
| 4,018,965 | 4/1977 | Kerko et al. | 65/30.11 X |
| 4,057,408 | 11/1977 | Pierson et al. | 65/30.11 X |
| 4,390,635 | 6/1983 | Morgan | 501/13 |
| 4,407,966 | 10/1983 | Kerko et al. | 501/13 |

Primary Examiner—Kenneth M. Schor
Attorney, Agent, or Firm—C. S. Janes, Jr.

[57] ABSTRACT

There is disclosed a method of producing a photochromic glass having a reduced transmittance for ultraviolet radiation while having substantially unimpaired photochromic properties. The method comprises providing a combination of 0.1–1.0% $CeO_2$ and 0.1–1.5% $Sb_2O_3$ and/or $As_2O_3$ as part of the glass composition. In an embodiment utilizing minimal silver content, the glass article in thicknesses of 1.3 to 2.0 mm. can be chemically strengthened to surpass the impact specification imposed by the Federal Food and Drug Administration for eyewear, will transmit less than 0.2% of radiation having wavelengths between 290–315 nm, and will demonstrate a darkened luminous transmittance at 20°–25° C. below 35% and a fading rate such that after five minutes the luminous transmittance will be at least 1.75 times that of the darkened transmittance. These glasses consist essentially of:

| $SiO_2$ | 55–61 | Ag | >0.1–<0.2 |
|---|---|---|---|
| $B_2O_3$ | 18–21 | Cl | 0.2–0.6 |
| $Al_2O_3$ | 5–11 | Br | 0.05–0.2 |
| $Li_2O$ | 1.5–3 | CuO | 0.003–0.015 |
| $Na_2O$ | 2–5 | $CeO_2$ | 0.1–1.0 |
| $K_2O$ | 4.5–8 | $Sb_2O_3$ | 0.1–1.5 |

4 Claims, 2 Drawing Figures

ULTRAVIOLET ABSORBING PHOTOCHROMIC GLASS OF LOW SILVER CONTENT

BACKGROUND OF THE INVENTION

Photochromic or phototropic glasses had their genesis in U.S. Pat. No. 3,208,860. Such glasses become darker, i.e., they change color, when subjected to actinic radiation, customarily ultraviolet radiation, and return to their original state when withdrawn from exposure to that radiation. That patent was addressed generally to silicate-based glasses, most preferably alkali metal aluminoborosilicate-based glasses, containing crystallites of at least one silver halide from the group of silver chloride, silver bromide, and silver iodide. The mechanism underlying the reversible darkening capability of those silver halide glasses was discussed in some detail in that patent and that explanation is incorporated herein by reference.

The most widespread commercial application for photochromic glasses has been as spectacle lenses, i.e., as prescription lenses and as non-prescription sunglasses. One of the first commercial photochromic ophthalmic lenses was marketed by Corning Glass Works, Corning, N.Y., under the trademark PHOTOGRAY.

Recently, some manufacturers of ophthalmic products have questioned whether the eye might be damaged by long term exposure to ultraviolet radiation. Particular attention has been directed to limiting transmission in the UV-B, or erythemal, zone. Such a limitation, if imposed, would present a potential problem to a photochromic lens manufacturer who considers using thinner glass with lower silver content in lens manufacture.

The thinner the lens the more lightweight it will be. Further, since silver is the single most expensive component of the glass, a reduction in the content thereof self-evidently decreases the cost of the glass. Unfortunately, however, those actions reduce the capability of the glass to absorb ultraviolet radiations in the erythemal zone. There is, of course, lack of agreement on the need to limit ultraviolet transmission. Nevertheless, to the extent that a glass lens of reduced transmission is deemed necessary or desirable, the present invention makes provision therefor in a thin, low-silver-content blank.

U.S. Pat. No. 4,407,966, issued Oct. 4, 1983 in the names of David J. Kerko and David L. Morse, discloses the utility of $CeO_2$ to reduce the transmittance at wavelengths in the near ultraviolet region of the radiation spectrum. However, it was also observed that the addition of any significant level of $CeO_2$ substantially degraded photochromic performance.

OBJECTIVES OF THE INVENTION

A basic objective is to provide a means of utilizing the ultravoilet absorbing properties of $CeO_2$ in a photochromic glass without degrading the photochromic properties of the glass.

Another objective is to provide photochromic glasses having a high degree of darkening capability coupled with a fast fading rate and low silver content.

A specific objective of the present invention is to provide copper-sensitized, silver halide-containing, photochromic glasses having a silver content less than 0.2% by weight which, when present in thickness dimensions of less than 2 mm, will transmit less than 0.2% of radiations having wavelengths between 290–315 nm.

Another specific objective is to provide photochromic glasses for sunglass use wherein the silver content is in the range of 0.10% to 0.20% and wherein the thickness of the glass is about 1.5 mm.

SUMMARY OF THE INVENTION

In one aspect then, our invention is a method of producing a photochromic glass having reduced transmittance for ultraviolet radiation while having substantially unimpaired photochromic properties, which comprises providing a combination of 0.1 to 1% $CeO_2$ and 0.1 to 1.5% $Sb_2O_3$ and/or $As_2O_3$ as part of the glass composition.

Application of our method permits producing a photochromic glass which contains a silver halide as a photochromic agent, which is copper sensitized and contains $<0.2\%$ Ag but $>0.1\%$ Ag, that, in cross section of $<2$ mm but $>1.3$ mm, can be chemically strengthened to pass the strength standards mandated by the FDA, and that, at 20°–25° C., exhibits a darkened luminous transmittance below 35% and a fading rate such that after five minutes the luminous transmittance will be at least 1.75 times that of the darkened transmittance.

Preferred embodiments of our invention are selected from an alkali metal-aluminoborosilicate sub-family of compositions. This sub-family, in addition to cerium plus antimony and/or arsenic oxides, is composed essentially, expressed in terms of weight percent on the oxide basis, of:

| | | | |
|---|---|---|---|
| $SiO_2$ | 55–61 | $K_2O$ | 4.5–8 |
| $B_2O_3$ | 18–21 | Ag | $>0.1-<0.2$ |
| $Al_2O_3$ | 5–11 | Cl | 0.2–0.6 |
| $Li_2O$ | 1.5–3 | Br | 0.05–0.2 |
| $Na_2O$ | 2–5 | CuO | 0.003–0.015 |

PRIOR LITERATURE

PHOTOGRAY lenses, marketed by Corning Glass Works, are produced from a glass having the following approximate analysis in weight percent.

| | | | |
|---|---|---|---|
| $SiO_2$ | 55.6 | PbO | 5.0 |
| $B_2O_3$ | 16.4 | $ZrO_2$ | 2.2 |
| $Al_2O_3$ | 8.9 | Ag | 0.16 |
| $Li_2O$ | 2.65 | CuO | 0.035 |
| $Na_2O$ | 1.85 | Cl | 0.24 |
| $K_2O$ | 0.01 | Br | 0.145 |
| BaO | 6.7 | F | 0.19 |
| CaO | 0.2 | | |

As can be understood, and PHOTOGRAY lenses are no exception, a commercial glass reflects comprises drawn between various process and product desiderata. For example, PHOTOGRAY lenses constitute the result of tradeoffs made between such parameters as photochromic behavior, ophthalmic properties, chemical durability, chemical strengthening capability, along with melting and forming characteristics. Stated in another way, to be suitable for commercial ophthalmic lenses a photochromic glass must possess the base physical properties and processing parameters of a standard ophthalmic glass.

Ophthalmic photochromic lenses, more recently marketed by Corning Glass Works under the trademark PHOTOGRAY EXTRA, are encompassed within the disclosure of U.S. Pat. No. 4,190,451. The glass employed, in the standard 2 mm thickness of ophthalmic lenses, displays the following photochromic properties:

(1) at about 40° C. will darken to a luminous transmittance below 55% in the presence of actinic radiation; will fade at least 25 percentage units of transmittance after five minutes' removal from the actinic radiation; and will fade to a luminous transmittance in excess of 80% in no more than two hours after being removed from the actinic radiation;

(2) at about 20° C. will darken to a luminous transmittance below 40% in the presence of actinic radiation; will fade at least 30 percentage units of transmittance after five minutes' removal from the actinic radiation; and will fade to a luminous transmittance in excess of 80% in no more than two hours after being removed from the actinic radiation; and (3) at about −18° C. will not darken to a luminous transmittance below 15% in the presence of actinic radiation.

As defined in that patent, the luminous transmittance of a glass is represented by the value Y delineated in terms of the 1931 C.I.E. trichromatic colorimetric system utilizing the light source Illuminant C. This colorimetric system and light source are described by A. C. Hardy in *Handbook of Colorimetry*, Technology Press, M.I.T., Cambridge, Mass. (1936).

The glass compositions encompassed within that patent consisted essentially, expressed in terms of weight percent on the oxide basis, of:

| | |
|---|---|
| $Li_2O$ | 0–2.5 |
| $Na_2O$ | 0–9 |
| $K_2O$ | 0–17 |
| $Cs_2O$ | 0–6 |
| $Li_2O + Na_2O + K_2O + Cs_2O$ | 8–20 |
| $B_2O_3$ | 14–23 |
| $Al_2O_3$ | 5–25 |
| $P_2O_5$ | 0–25 |
| $SiO_2$ | 20–65 |
| CuO | 0.004–0.02 |
| Ag | 0.15–0.3 |
| Cl | 0.1–0.25 |
| Br | 0.1–0.2 |
| Ag: (Cl + Br) | 0.65–0.95 |
| molar ratio of alkali metal oxide: $B_2O_3$ | 0.55–0.85 |

PHOTOGRAY EXTRA lenses have the approximate composition, expressed in terms of weight percent on the oxide basis, of:

| | | | |
|---|---|---|---|
| $SiO_2$ | 55.8 | $ZrO_2$ | 4.89 |
| $Al_2O_3$ | 6.48 | $TiO_2$ | 2.17 |
| $B_2O_3$ | 18.0 | CuO | 0.011 |
| $Li_2O$ | 1.88 | Ag | 0.24 |
| $Na_2O$ | 4.04 | Cl | 0.20 |
| $K_2O$ | 5.76 | Br | 0.13 |

PHOTOGRAY and PHOTOGRAY EXTRA lenses have been formed in accordance with the standard techniques employed in the fabrication of conventional, i.e., non-photochromic, ophthalmic lenses. Hence, a glass blank is pressed and that blank ground and polished to a predetermined prescription. The glass blank is heat treated in accordance with a predefined schedule to develop silver halide crystallites therein which, in turn, impart photochromic properties thereto.

U.S. Pat. Nos. 4,018,965 and 4,130,437 observed that non-prescription photochromic lenses, for example, sunglass lenses, could be produced without resort to the above-described techniques of grinding and polishing. Both patents described potentially photochromic glass compositions having the capability of being drawn into glass sheet; the expression potentially photochromic designating glass which, as drawn into sheet, is essentially non-photochromic but which, after being exposed to an appropriate heat treatment, will manifest photochromic character.

The glasses of each patent possess the capability of being chemically strengthened, when employed as sheet in thicknesses over the interval of about 1.3–1.7 mm, to comply with the strength standards for eyeglass lens safety mandated by the Federal Food and Drug Administration (FDA). The preferred glass compositions of U.S. Pat. No. 4,130,437 can be simultaneously heat treated to develop photochromic behavior therein and to sag the glass sheet into molds to form eyeglass lens blanks of the desired curvature in the manner disclosed in U.S. Pat. No. 4,088,470. That faculty, plus the capability of being readily formed into sheet, enables the relatively inexpensive and rapid production of sunglass lenses.

The operable ranges of glass compositions disclosed in those patents are set out below in terms of weight percent on the oxide basis:

| | U.S. Pat. No. 4,018,965 | U.S. Pat. No. 4,130,437 |
|---|---|---|
| $SiO_2$ | 54–66 | 54–66 |
| $Al_2O_3$ | 7–15 | 7–15 |
| $B_2O_3$ | 10–25 | 10–25 |
| $Li_2O$ | 0.5–4 | 0.5–4 |
| $Na_2O$ | 3.5–15 | 3.5–15 |
| $K_2O$ | 0–10 | 0–10 |
| $Li_2O + Na_2O + K_2O$ | 6–16 | 6–16 |
| PbO | 0–3 | 0–1.25 |
| Ag | 0.1–1 | 0.1–0.3 |
| Cl | 0.1–1 | 0.2–1 |
| Br | 0–3 | 0–0.3 |
| CuO | 0.008–0.16 | 0.002–0.02 |
| F | 0–2.5 | 0–2.5 |

U.S. Pat. No. 4,168,339 describes the fabrication of photochromic glass as microsheet, i.e., sheet glass with thickness dimensions between about 0.25–0.5 mm. Glasses suitable for forming such sheet have compositions, expressed in terms of weight percent on the oxide basis, of:

| | | | |
|---|---|---|---|
| $SiO_2$ | 54–66 | PbO | 0.4–1.5 |
| $Al_2O_3$ | 7–16 | Br | 0.2–0.5 |
| $B_2O_3$ | 10–30 | Cl | 0.5–1.2 |
| $Na_2O$ | 3–15 | F | 0.2–0.5 |
| $Li_2O$ | 0–4 | CuO | 0.008–0.03 |
| $K_2O$ | 0–10 | Ag | >0.03–1 |

U.S. Pat. No. 4,358,542 is also directed to the production of photochromic glasses in sheet form which, where desired, can be simultaneously heat treated to induce photochromic behavior therein and to sag the glass into conformance with molds to form spectacle lens blanks of a suitable curvature. Those glasses are stated to consist essentially, expressed in terms of weight percent on the oxide basis, of:

| | | | |
|---|---|---|---|
| $SiO_2$ | 58.5–60 | PbO | 0.1–0.25 |
| $Al_2O_3$ | 9–10 | Ag | 0.1–0.15 |
| $B_2O_3$ | 19–20.5 | Cl | 0.3–0.5 |
| $Li_2O$ | 2–2.5 | Br | 0.05–0.15 |
| $Na_2O$ | 2–3 | CuO | 0.0065–0.01 |

| | | | |
|---|---|---|---|
| K₂O | 6-7 | | |

U.S. Pat. No. 4,407,966, issued Oct. 4, 1983 in the names of David J. Kerko and David L. Morse, is directed to the production of photochromic glasses displaying very rapid fade rates. The glasses disclosed consist essentially, expressed in terms of weight percent on the oxide basis, of:

| | | | |
|---|---|---|---|
| $SiO_2$ | 56-60 | $TiO_2$ | 0-3 |
| $B_2O_3$ | 18-21 | PbO | 0.1-0.15 |
| $Al_2O_3$ | 6-9 | Ag | >0.15-0.25 |
| $Li_2O$ | >2.5-3.5 | Cl | 0.2-0.35 |
| $Na_2O$ | 0.5-2.5 | Br | 0.075-0.15 |
| $K_2O$ | 5-7 | CuO | 0.004-0.02 |
| $ZrO_2$ | 3.75-5 | | |

The optional addition of $CeO_2$ is disclosed as being effective to reduce the transmission in the near ultraviolet portion of the radiation spectrum.

The photochromic characteristics of the several above-disclosed glasses are stated to be as follows:

The glasses of U.S. Pat. No. 4,018,965 are asserted to exhibit at ambient temperatures, viz., 20°-25° C., a clear luminous transmittance of at least 60%, a darkened luminous transmittance not exceeding 25%, and a rate of fading such that the glass evidences a faded luminous transmittance after a five-minute fading period from the darkened state of at least 1.5 times that of the darkened transmittance;

The glasses of U.S. Pat. No. 4,130,437 are noted as demonstrating at temperatures of 20°-25° C. clear luminous transmittances of at least 60%, darkened luminous transmittances below 30%, fading rates such that the glasses exhibit faded luminous transmittances after a five-minute interval from the darkened state of at least 1.75 times those of the darkened transmittances, and, after one-hour fading period, the glasses manifest luminous transmittances greater than 80% of their original luminous transmittances;

The glasses of U.S. Pat. No. 4,168,339 are stated to evidence darkened luminous transmittances at room temperature below 50% and fading rates such that, after a five-minute period of fading from the darkened state, the transmittances will have increased by at least 20 percentage units and, after a one-hour fading interval, the glasses will exhibit luminous transmittances in excess of 80%;

The glasses of U.S. Pat. No. 4,358,542 are observed to demonstrate a clear luminous transmittance greater than 65%, darkened luminous transmittances at 20° C. below 25%, fading rates at 20° C. such that the glasses manifest faded luminous transmittances of at least twice those of the darkened transmittances after a five-minute fading period, darkened transmittances at 40° C. below 45%, fading rates at 40° C. such that the glasses display faded luminous transmittances of at least 1.75 times those of the darkened transmittances after a five-minute fading period.

The glasses of U.S. Pat. No. 4,407,966 are averred to exhibit darkened luminous transmittances at 40° C. below 35%, five-minute fading rates at 40° C. of at least 40 units of transmittance, darkened luminous transmittances at 25° C. below 25%, and five-minute fading rates at 25° C. of at least 35 units of transmittance.

Finally, U.S. application Ser. No. 353,199, filed Mar. 1, 1982 in the name of David W. Morgan, now U.S. Pat. No. 4,390,135, describes the production of silver halide-containing, alkali metal aluminoborosilicate photochromic glasses sensitized by copper wherein the majority of the copper is present in the $Cu^+$ state rather than the $Cu^{+2}$ state. That phenomenon was accomplished via the inclusion of at least 0.025% $As_2O_3$ and/or $Sb_2O_3$ in the glass composition.

Operable glass compositions are asserted to consist essentially, expressed in terms of weight percent on the oxide basis, of about 4-26% $Al_2O_3$, 4-26% $B_2O_3$, 40-76% $SiO_2$, at least one alkali metal oxide in the indicated proportion of 2-8% $Li_2O$, 4-15% $Na_2O$, 4-15% $K_2O$, 8-25% $Rb_2O$, and 10-30% $Cs_2O$, at least one halogen in the minimum effective porportion of 0.2% chlorine, 0.1% bromine, and 0.08% iodine, a minimum of silver in the indicated proportion of 0.2% in a glass wherein the effective halogen is chlorine, 0.05% in a glass containing at least 0.1% bromine, but less than 0.08% iodine, and 0.03% in a glass containing 0.08% iodine, the sum of $Al_2O_3$, $B_2O_3$, $SiO_2$, alkali metal oxide, silver, and halogen being at least 85% of the total composition, 0.004-0.03% CuO, and at least 0.025% $As_2O_3$ and/or $Sb_2O_3$, but less than that amount which will reduce a substantial portion of the silver ions to metallic silver. The content of $As_2O_3$ and/or $Sb_2O_3$ generally ranges about 0.025—0.25%.

U.S. Pat. No. 1,545,509 (Montgomery and Scott) discloses glasses containing up to 4.74% $CeO_2$ to decrease the transmission of ultraviolet light, and the addition of up to 16% $Sb_2O_3$ to supplement the absorption characteristics of the $CeO_2$ and to reduce discoloration caused by it. The use of cerium oxide ($CeO_2$) to reduce discoloration of glass in cathode ray tubes exposed to electron bombardment and X-radiation is disclosed in U.S. Pat. No. 2,477,329 (de Gier). Use of up to 0.05% $CeO_2$ with up to 0.15 $Sb_2O_3$ is shown in U.S. Pat. No. 2,515,275 (Stookey). The $CeO_2$ enhances photosensitivity while the $Sb_2O_3$ acts as a fining agent. U.S. Pat. No. 4,257,811 (Jahn) adds $CeO_2$ to an optical glass to resist solarization and avoid discoloration. The glass is free of alkaline earth metal oxides and contains small amounts of ZnO and SrO.

GENERAL DESCRIPTION

Our invention is predicated in large measure on our discovery that the photochromic behavior in a thin, low silver content, photochromic glass that contains cerium oxide can be essentially restored by also including arsenic and/or antimony oxide ($Sb_2O_3$) in the composition.

Laboratory experience has demonstrated that about 0.1% $CeO_2$ is demanded to insure that the glass will transmit less than 0.2%, and that about 0.3% will effect virtually total absorption, of ultraviolet radiation over the wavelength range of 290-315 nm. The actual amount required is, of course, dependent upon the thickness of the glass lens and the level of Ag present in the composition.

Up to 1% $CeO_2$, and even greater quantities, can be operable. However, because of the inherent high cost of $CeO_2$ and the fact that no advantageous absorption flows therefrom, 1% has been deemed a practical maximum. Moreover, because the presence of $CeO_2$ produces a highly oxidizing environment in the glass, values between about 0.1-0.4% have been deemed preferred.

In general, an amount of $Sb_2O_3$ and/or $As_2O_3$ at least 75% of that utilized of $CeO_2$ will be incorporated into the composition. Because of its function in reducing $Cu^{+2}$ ions to $Cu^+$ ions and thereby improving the photochromic character of the glass, as much as 50% more $Sb_2O_3$ and/or $As_2O_3$ than $CeO_2$ may advantageously be included. Such extra addition permits the reduction of extraneous oxidizing agents, e.g., $Cr_2O_3$, present in the glass. However, care must be exercised to avoid reducing the silver ions (or other readily reducible metal ions such as lead ions) to colloidal metal particles.

In summary, about 0.1–1% $CeO_2$ and 0.1–1.5% $As_2O_3$ and/or $Sb_2O_3$ will be made part of the glass composition with the preferred amounts varying between about 0.1–0.4% $CeO_2$ and 0.15–0.5% $Sb_2O_3$ and/or $As_2O_3$.

The method for forming glass articles manifesting the desired photochromic properties comprises the three general steps customarily used in the art:

(a) a glass-forming batch of the proper composition is melted;

(b) the melt is simultaneously cooled and a glass article of a desired geometry is shaped therefrom; and thereafter (c) the glass article is subjected to a temperature between about 650°–675° C. for a sufficient period of time to cause the growth of silver halide crystallites therein which produce the photochromic behavior in the glass.

The inventive process appears to be applicable essentially irrespective of the base composition of the photochromic glass so long as AgCl, AgBr, and/or AgI crystals comprise the photochromic elements. For example, U.S. Pat. No. 3,548,060 describes glasses having base compositions within the $Al_2O_3$—$B_2O_3$—RO system, i.e., the glasses consist essentially, by weight, of 30–86% $B_2O_3$, 2–35% $Al_2O_3$, and 12–45% of an alkaline earth metal oxide. U.S. Pat. No. 3,703,388 discusses glasses having base compositions within the $La_2O_3$—$B_2O_3$ field, i.e., the glasses consist essentially, by weight, of 15–75% $La_2O_3$ and 13–65% $B_2O_3$. U.S. Pat. No. 3,834,912 discloses glasses having base compositions within the PbO—$B_2O_3$ system, i.e., the glasses consist essentially, by weight, of 14.2–48% $B_2O_3$, 29–73% PbO, 0–15% alkaline earth metal oxides, and 0–23% $ZrO_2$, $Al_2O_3$ and/or ZnO. U.S. Pat. No. 3,876,436 is directed to glasses having base compositions within the $R_2O$—$Al_2O_3$—$P_2O_5$ field, i.e., the glasses consist essentially, by weight, of at least 17% $P_2O_5$, 9–34% $Al_2O_3$, not more than 40% $SiO_2$, not more than 19% $B_2O_3$, and at least 10% alkali metal oxides. U.S. Pat. No. 3,957,498 is drawn to glasses having base compositions within the $R_2O$—$Al_2O_3$—$SiO_2$ system, i.e., the glasses consist essentially, by weight, of 13–21% alkali metal oxides, 17–25% $Al_2O_3$, and 45–56% $SiO_2$.

Finally, as was noted above in the discussion of U.S. Pat. No. 3,208,860, the currently commercially-marketed, photochromic glasses have base compositions within the alkali metal aluminoborosilicate system. The patent cites, as preferred compositions, glasses consisting essentially, by weight, of 4–26% $Al_2O_3$, 4–26% $B_2O_3$, 40–76% $SiO_2$, and at least one alkali metal oxide selected from the group of 2–8% $Li_2O$, 4–15% $Na_2O$, 6–20% $K_2O$, 8–25% $Rb_2O$, and 10–30% $Cs_2O$. Such glasses contain, by weight on the basis of chemical analysis, at least one halogen in the minimum effective proportion of 0.2% chlorine, 0.1% bromine, and 0.08% iodine, and a minimum of silver in the indicated proportion of 0.2% where the effective halogen consists of chlorine, 0.05% where the effective halogen is bromine, but the glass contains less than 0.08% iodine, and 0.03% where the glass contains at least 0.08% iodine. Where a transparent article is desired, the total silver will not exceed 0.7% and the total of the three recited halogens will not exceed 0.6%. The sum of the recited base glass constituents, silver, and halogens will compose at least 85% of the composition. We prefer then to utilize a glass selected from this alkali metal aluminoborosilicate family in view of the available production experience.

Within the broad alkali metal aluminoborosilicate family, there has been found a narrow sub-family that utilizes very low silver contents while providing superior photochromic properties. This sub-family includes glasses disclosed in U.S. Pat. No. 4,358,542 described earlier.

Glasses of this sub-family, as combined and modified in terms of the present invention, and as calculated in parts by weight on an oxide basis, come within these preferred ranges:

| | | | |
|---|---|---|---|
| $SiO_2$ | 55–61 | $La_2O_3$ | 0–5 |
| $B_2O_3$ | 18–21 | PbO | 0–0.25 |
| $Al_2O_3$ | 5–11 | $CeO_2$ | 0.1–1.0 |
| $Li_2O$ | 1.5–3 | $Sb_2O_3 + As_2O_3$ | 0.1–1.5 |
| $Na_2O$ | 2–5 | Ag | 0.10–0.20 |
| $K_2O$ | 4.5–8 | CuO | 0.004–0.02 |
| $ZrO_2$ | 0–5 | Cl | 0.2–0.5 |
| $TiO_2$ | 0–3 | Br | 0.05–0.15 |

The initial clear luminous levels of transmittance displayed by the glasses are in the vicinity of 90% unless well-known tinting agents, such as the transition metal oxides CoO, NiO, and $V_2O_5$ and/or the rare earth metal oxides $Er_2O_3$, $Ho_2O_3$, $Nd_2O_3$, and $Pr_2O_3$, are added to reduce the initial transmittance values. However, because the quantity of colorant employed is very small (up to about 1% for the transition metal oxides and up to 5% of the rare earth oxides), the overall photochromic character of the glass is not substantially affected by such addition.

The inclusion of up to 0.25% PbO may be helpful in improving the darkening capability of the glasses, especially where high $Li_2O$ contents are utilized. Minor amounts of ingredients such as $ZrO_2$, $La_2O_3$, and $TiO_2$ may be added to adjust the refractive index of the glass. In general, individual amounts thereof will not exceed about 5% for $ZrO_2$ and $La_2O_3$ and about 3% for $TiO_2$, with the total of the three being less than about 10%. $TiO_2$ also has the effect of absorbing ultraviolet radiation in the near ultraviolet region of the radiation spectrum, i.e., over the range of about 315–380 nm. That feature can be useful in protecting the wearer of eyeglasses, but it also has an adverse effect upon the photochromic behavior of the glass. Accordingly, care must be exercised in its use.

DESCRIPTION OF PREFERRED EMBODIMENTS

Figure 1:
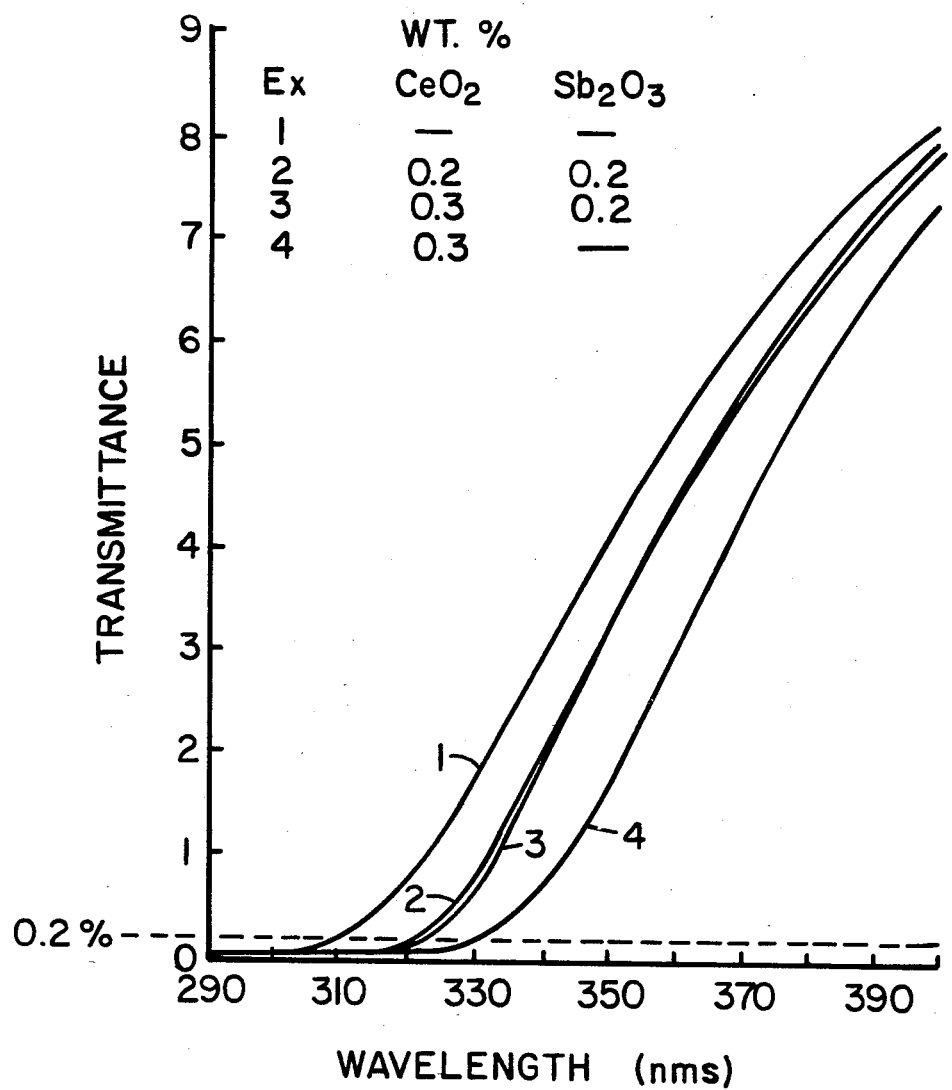
FIG. 1 presents transmittance curves for several glasses over the range of wavelengths 290–400 nm.

TABLE 1 reports several glass compositions, expressed in terms of parts by weight on the oxide basis, illustrating the compositional parameters of the inventive glasses. Because it is not known with which cation(s) the halides are combined and the fact that their quantities are so small, they are merely tabulated as chloride and bromide, in accordance with conventional glass analysis practice. Likewise, since the amounts of silver are extremely small, they are designated on an elemental basis. Finally, inasmuch as the sum of the individual components closely approximates 100, for all practical purposes the figures recorded may be considered to reflect weight percent.

The actual batch ingredients may comprise any materials, either the oxide or other compound, which, when melted together, will be converted into the desired oxide in the proper proportions. The halides will normally be added as a metal salt.

Batches for the exemplary compositions were compounded and melted in a laboratory scale, continuous glass melting unit operating at about 1450° C. After a period of three hours, the melt was drawn into glass sheet having a thickness dimension of about 1.5 mm and the sheet passed into an annealer operting at about 375° C. Photochromic behavior was developed via heat treatment of about 15 minutes at a temperature of about 660° C. This was followed by heat treatment at 400° C. for 16 hours to simulate the commercial chemical strengthening schedule.

TABLE I

|  | 1 | 2 | 3 | 4 |
|---|---|---|---|---|
| $SiO_2$ | 57.4 | 59.2 | 59.1 | 59.3 |
| $B_2O_3$ | 19.7 | 19.6 | 19.6 | 19.7 |
| $Al_2O_3$ | 9.66 | 9.62 | 9.60 | 9.63 |
| $Li_2O$ | 2.20 | 2.19 | 2.19 | 2.19 |
| $Na_2O$ | 2.95 | 2.94 | 2.94 | 2.95 |
| $K_2O$ | 6.35 | 6.32 | 6.31 | 6.33 |
| Ag | 0.175 | 0.174 | 0.174 | 0.175 |
| CuO | 0.008 | 0.008 | 0.008 | 0.008 |
| PbO | 0.13 | 0.13 | 0.13 | 0.13 |
| $Sb_2O_3$ | — | 0.208 | 0.307 | — |
| $CeO_2$ | — | 0.199 | 0.298 | 0.299 |
| Br | 0.085 | 0.084 | 0.084 | 0.084 |
| Cl | 0.441 | 0.439 | 0.438 | 0.439 |

The inventive photochromic glasses are activated principally through radiation in the ultraviolet and short visible regions of the radiation spectrum. However, experience has indicated that the correlation between test data secured via exposure to an ultraviolet lamp and values measured with solar radiation outdoors was often imperfect. Consequently, to achieve better correlation with outdoor solar radiation, a "solar simulator" apparatus was devised and is described in U.S. Pat. No. 4,125,775.

The apparatus employs a 150 watt xenon arc source fitted with a filter to modify the spectral output such as to closely approximate the radiation spectrum of the sun, particularly in the ultraviolet, blue, and red portions. The infrared interval of the spectrum is attenuated with a film of water of sufficient thickness to provide irradiance equal to that of the sun, but with no special concern for the spectral distribution within that region.

The intensity of the arc source was adjusted such that the measure of darkening was equivalent to that of several commercially available photochromic glasses, including PHOTOGRAY lens blanks, darkened outdoors at noon during a cloudless summer day in Corning, N.Y. (air mass value of about 1.06). Numerous experimental photochromic glasses of widely-disparate compositions have also been subjected to the outdoor sunlight and the solar simulator. A comparison of the data evidences excellent overall agreement.

Continuous monitoring of the darkened transmittance manifested by the samples is obtained by interrogating each with a chopped beam of light from a tungsten-halogen lamp detected by a PIN silicon photodiode whose output was demodulated by a lock-in amplifier. A composite color filter was placed into the beam to approximate the response of the human eye under Illuminant C, as defined by C.I.E.

The apparatus was interfaced to a PDP-11/04 computer (marketed by Digital Equipment Corporation, Maynard, Mass.) to permit automatic sample change, temperature selection, event sequencing, and data collection, storage, reduction, and retrieval with a minimum of operator's involvement.

TABLE II reports (1) electron paramagnetic resonance (EPR) measurements conducted to determine the level of $Cu^{+2}$ ions in the glasses and (2) photochromic properties demonstrated by the glasses at ambient temperatures, viz., 20°–25° C. With respect to the latter, $T_o$ signifies the initial transmittance of the samples prior to exposure to the solar simulator, $T_{D10}$ designates the diminished transmittance of the samples after exposure to the solar simulator for 10 minutes, $T_{F5}$ indicates the units of transmittance observed for each sample five minutes after its removal from the solar simulator. $\Delta T_{F5}$ indicates the fadeback, that is ($T_{F5}-T_{D10}$) as a darkened sample is removed from activating radiation. Similarly, the rate of darkening is shown by subtracting $T_{D10}$ from $T_o$.

TABLE II

|  | 1 | 2 | 3 | 4 |
|---|---|---|---|---|
| | EPR Data (%) | | | |
| $Cu^{+2}$ | 0.0027 | 0.0005 | 0.0005 | 0.0044 |
| *$Cu^+$ | 0.0053 | 0.0075 | 0.0075 | 0.0036 |
| | Photochromic Properties | | | |
| $T_o$ | 90.6 | 90.3 | 90.0 | 90.3 |
| $T_{D10}$ | 32.7 | 33.3 | 32.4 | 34.8 |
| $T_{F5}$ | 58.7 | 66.5 | 64.4 | 51.3 |
| $\Delta T_{F5}$ | 26.0 | 33.2 | 32.0 | 16.5 |

*By difference between $Cu^{+2}$ and batched level.

An examination of TABLE II (Examples 1 and 4) illustrates the impairment which $CeO_2$ exerts upon the photochromic performance of the glass. Hence, Example 4 does not darken to the extent of Example 1 and fades substantially slower. The reducing effect $Sb_2O_3$ has upon the $Cu^{+2}$ ions and the resulting improvement in photochromic behavior is apparent in a study of Examples 2 and 3.

FIG. 1 exhibits transmittance curves for glass samples of Examples 1–4 over the range of wavelengths 290–400 nm. Radiation wavelength is plotted along the horizontal, while transmittance, as measured in standard manner, is plotted along the vertical. The numeral designations of the curves correspond to the example designations in TABLE I. To facilitate reference, the $CeO_2$ and $Sb_2O_3$ contents of the examples are tabulated on the drawing.

Figure 2:
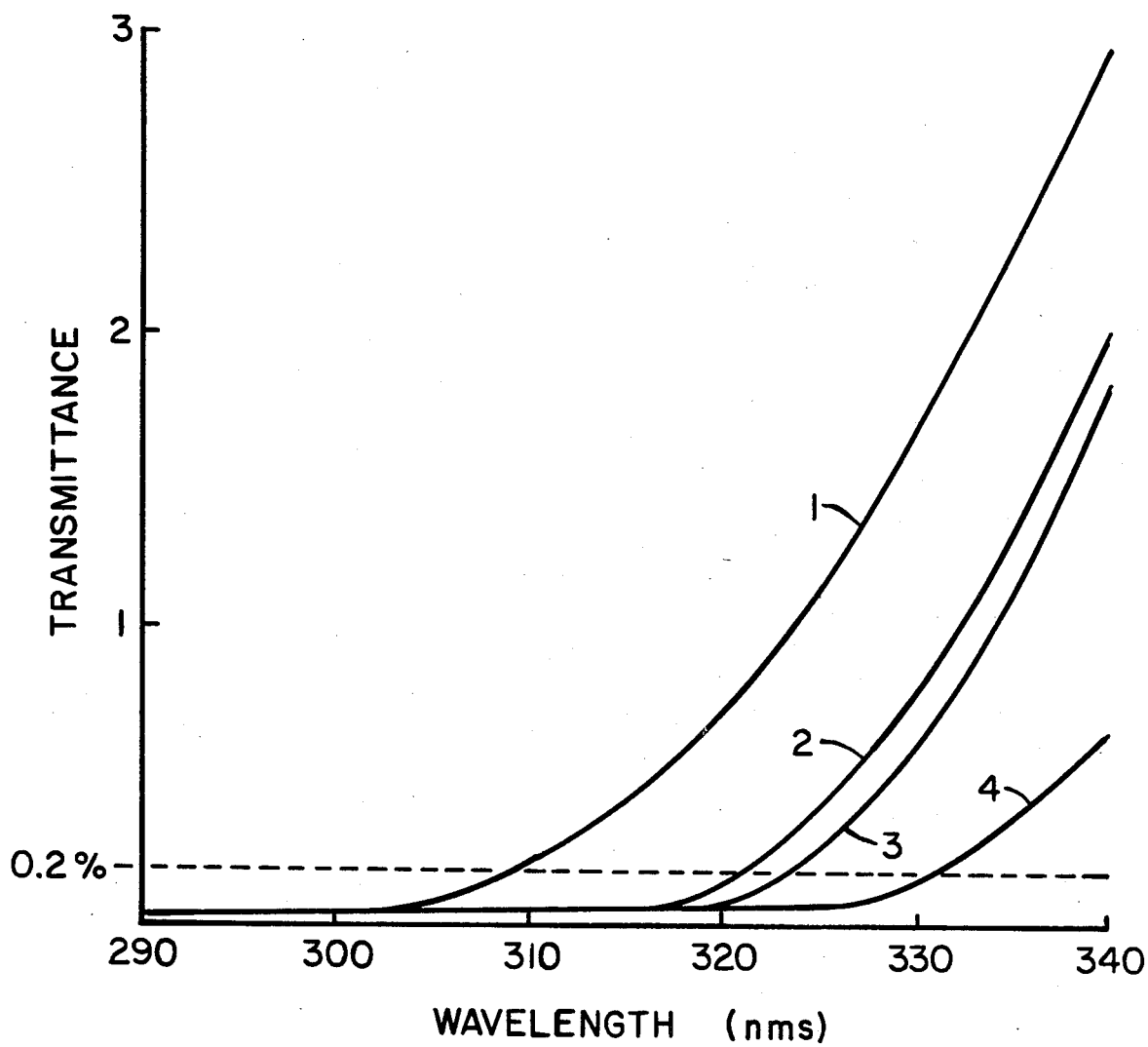
FIG. 2 presents an expanded version of a small portion of FIG. 1.

In order to study effects of the minute magnitude here involved, it is necessary to substantially enlarge or magnify the graphical showing, or at least a small critical portion thereof. FIG. 2 is such an enlargement of that portion of FIG. 1 encompassing the so-called erythemal zone. The axes are plotted as in FIG. 1, but wavelength spans only 285–330 nms. and transmittance is plotted to 3.0%. A 0.2% limit line is shown dashed.

The capability of $CeO_2$ to absorb radiation in the 290–315 nm region is quite evident from these curves. It can be observed that Example 1 transmits over 3% of the radiation at 315 nm, whereas Examples 2–4 are within the 0.2% limit up to that wavelength. The operation of $Sb_2O_3$ in reducing $CeO_2$, thereby increasing transmission of ultraviolet radiation, is evident through a study of Examples 3 and 4. Thus, both Examples have the same level of $CeO_2$, but Example 4, which is free from $Sb_2O_3$, is more absorbing at 315 nm.

When specimens of the glass sheet of the above compositions are subjected to the chemical strengthening practice customarily utilized with PHOTOGRAY EXTRA lenses, viz., immersion for 16 hours in a bath of molten salt consisting of 60% by weight $KNO_3$ and 40% by weight $NaNO_3$ operating at 400° C., followed by rinsing off any adhering salt with tap water, they readily pass the FDA strength standards for eyeglass safety.

The efficacy of arsenic oxide ($As_2O_3$) as an alternative to $Sb_2O_3$ was demonstrated in a continuous melting program. In this program, a base glass was employed having the following composition expressed in terms of oxides on a cationic percentage base:

| | |
|---|---|
| Si | 47.0 |
| B | 26.9 |
| Al | 9.0 |
| Li | 7.0 |
| Na | 3.7 |
| K | 6.4 |

Several additives were incorporated in constant amount in this base glass to impart photochromic potential. Finally, arsenic oxide was added in varying amounts to provide the following compositions as the melting campaign progressed. These compositions are set forth in weight percent on a calculated oxide basis in TABLE III hereafter:

TABLE III

| | 5 | 6 | 7 | 8 |
|---|---|---|---|---|
| $SiO_2$ | 59.2 | 58.9 | 59.1 | 59.2 |
| $B_2O_3$ | 19.7 | 19.6 | 19.6 | 19.7 |
| $Al_2O_3$ | 9.6 | 9.6 | 9.6 | 9.6 |
| $Li_2O$ | 2.2 | 2.2 | 2.2 | 2.2 |
| $Na_2O$ | 2.4 | 2.4 | 2.4 | 2.4 |
| $K_2O$ | 6.3 | 6.3 | 6.3 | 6.3 |
| Ag | 0.178 | 0.178 | 0.178 | 0.178 |
| CuO | 0.006 | 0.006 | 0.006 | 0.006 |
| PbO | 0.130 | 0.129 | 0.129 | 0.130 |
| $CeO_2$ | 0.299 | 0.298 | 0.299 | 0.299 |
| $As_2O_3$ | — | 0.455 | 0.228 | — |
| Cl | 0.426 | 0.424 | 0.425 | 0.426 |
| Br | 0.108 | 0.107 | 0.107 | 0.108 |

The melting temperature was about 1400° C., the batches were ball milled, and the glass melt stirred to promote homogeneity. The molten glass was formed as plano pressings which were ground and polished to provide a lens thickness of 1.5 mm. These were given a standard photochromic thermal development by heating for fifteen (15) minutes at 660° C. Darkening and fade rates were observed using a Huntermeter. The data is recorded in TABLE IV wherein $T_o$, $T_{D10}$ and $\Delta T_{F5}$ have the meanings set forth earlier.

TABLE IV

| $T_o$ | $T_{D10}$ | $\Delta T_{F5}$ |
|---|---|---|
| 90.3 | 25.4 | 16.3 |
| 90.6 | 25.1 | 23.7 |
| 90.6 | 24.9 | 23.3 |
| 90.7 | 25.2 | 23.5 |
| 90.8 | 24.2 | 22.2 |
| 90.8 | 24.4 | 22.4 |
| 91.0 | 24.6 | 22.8 |
| 90.9 | 24.8 | 23.0 |
| 90.9 | 24.2 | 22.3 |
| 90.4 | 24.0 | 22.0 |
| 90.7 | 25.0 | 22.5 |
| 90.6 | 25.5 | 20.3 |

It is apparent that the absence of arsenic oxide at the beginning and end of the melting run had a rather small, although noticeable, effect on extent of darkening in ten minutes. On the other hand, the effect on degree of fading, and hence on fade rate, is much more substantial. However, once an arsenic oxide presence was established, changes in amount appeared to have little effect.

A further series of glass compositions was formulated to illustrate applicability of the present invention to photochromic glasses. This series was derived from the base glass composition employed above. This composition in terms of oxides on a cationic percent basis, is composed of:

| | |
|---|---|
| Si | 47.0 |
| Al | 9.0 |
| B | 26.9 |
| Li | 7.0 |
| K | 6.4 |
| Na | 3.7 |

TABLE V reports the additives employed, in weight percent on an oxide basis, in formulating the illustrative series:

TABLE V

| | 9 | 10 | 11 | 12 | 13 |
|---|---|---|---|---|---|
| Ag | 0.189 | 0.188 | 0.187 | 0.188 | 0.188 |
| CuO | 0.008 | 0.008 | 0.008 | 0.008 | 0.008 |
| PbO | 0.120 | 0.119 | 0.119 | 0.120 | 0.119 |
| $Sb_2O_3$ | — | 0.306 | 0.599 | 0.296 | 0.296 |
| $CeO_2$ | — | 0.298 | 0.593 | 0.298 | 0.297 |
| CoO | 0.052 | 0.052 | 0.052 | 0.052 | 0.052 |
| NiO | 0.372 | 0.370 | 0.369 | 0.370 | 0.370 |
| $TiO_2$ | — | — | — | 0.295 | 0.599 |
| Br | 0.085 | 0.084 | 0.084 | 0.084 | 0.084 |
| Cl | 0.452 | 0.449 | 0.447 | 0.449 | 0.448 |

In each of these glasses, the variable additives are titanium, antimony and cerium oxides. Examples 12 and 13 have titania included to adjust index and to reduce transmission in the 315–380 nm region. Likewise, all examples contain additions of nickel and cobalt oxides which act as colorants and permanently reduce spectral transmission.

The glasses were melted in a continuous melter for three (3) hours at 1450° C. The melted glass was drawn as 1.5 mm thick sheet glass suitable for producing sagged lenses, and was annealed at 375° C.

Transmittance values were measured for each glass at five nanometer intervals over a UV-B range of 290–315 nm and over a UV-A range of 315–380 nm. The average over each range was determined and is shown in TABLE VI in conjunction with weight percent figures for the variable oxide additives.

TABLE VI

|  | 9 | 10 | 11 | 12 | 13 |
|---|---|---|---|---|---|
| Avg. (290–315 nm) | 0.80 | 0 | 0 | 0 | 0 |
| Avg. (315–380 nm) | 17.1 | 16.0 | 15.8 | 15.0 | 10.7 |
| $Sb_2O_3$ | 0 | 0.31 | 0.61 | 0.31 | 0.31 |
| $CeO_2$ | 0 | 0.30 | 0.60 | 0.30 | 0.30 |
| $TiO_2$ | 0 | 0 | 0 | 0.30 | 0.60 |

We claim:

1. A method for producing a photochromic glass article that, in cross section of <2 mm but >1.3 mm, will transmit less than 0.2% of radiations having wavelengths between 290–315 nm, can be chemically strengthened to pass the strength standards mandated by the FDA, and at 20°–25° C. will exhibit a darkened luminous transmittance below 35% and a fading rate such that after five minutes the luminous transmittance will be at least 1.75 times that of the darkened transmittance, which method comprises the steps of:

(a) melting a batch for a glass consisting essentially, expressed in terms of weight percent on the oxide basis, of

| $SiO_2$ | 55–61 | $CeO_2$ | 0.1–1 |
|---|---|---|---|
| $B_2O_3$ | 18–21 | Ag | >0.1–<0.2 |
| $Al_2O_3$ | 5–11 | CuO | 0.003–0.015 |
| $Li_2O$ | 1.5–3 | Cl | 0.2–0.6 |
| $Na_2O$ | 2–5 | Br | 0.05–0.2 |
| $K_2O$ | 4.5–8 | $Sb_2O_3$ and/or $As_2O_3$ | 0.1–1.5 | wherein the amount of $Sb_2O_3$ and/or $As_2O_3$ is at least 75% of the amount of $CeO_2$ present;

(b) cooling said melt and simultaneously forming a glass article of a desired geometry therefrom; and thereafter (c) heating said glass article to a temperature between about 650°–675° C. for a sufficient period of time to cause the growth of silver halide crystallites therein whereby said photochromic glass article is provided which, at 20°–25° C., will exhibit a darkened luminous transmittance below 35% and a fading rate such that after five minutes the luminous transmittance will be at least 1.75 times that of the darkened transmittance.

2. A method according to claim 1 wherein said $CeO_2$ ranges about 0.1–0.4% and said $Sb_2O_3$ and/or $As_2O_3$ ranges about 0.15–0.5%.

3. A method according to claim 1 wherein said glass also contains up to 0.25% PbO.

4. A method according to claim 1 wherein said glass also contains up to 10% total of at least one of the following oxides in the indicated proportions of up to 5% $La_2O_3$, up to 5% $ZrO_2$, and up to 3% $TiO_2$.

* * * * *